UNITED STATES PATENT OFFICE.

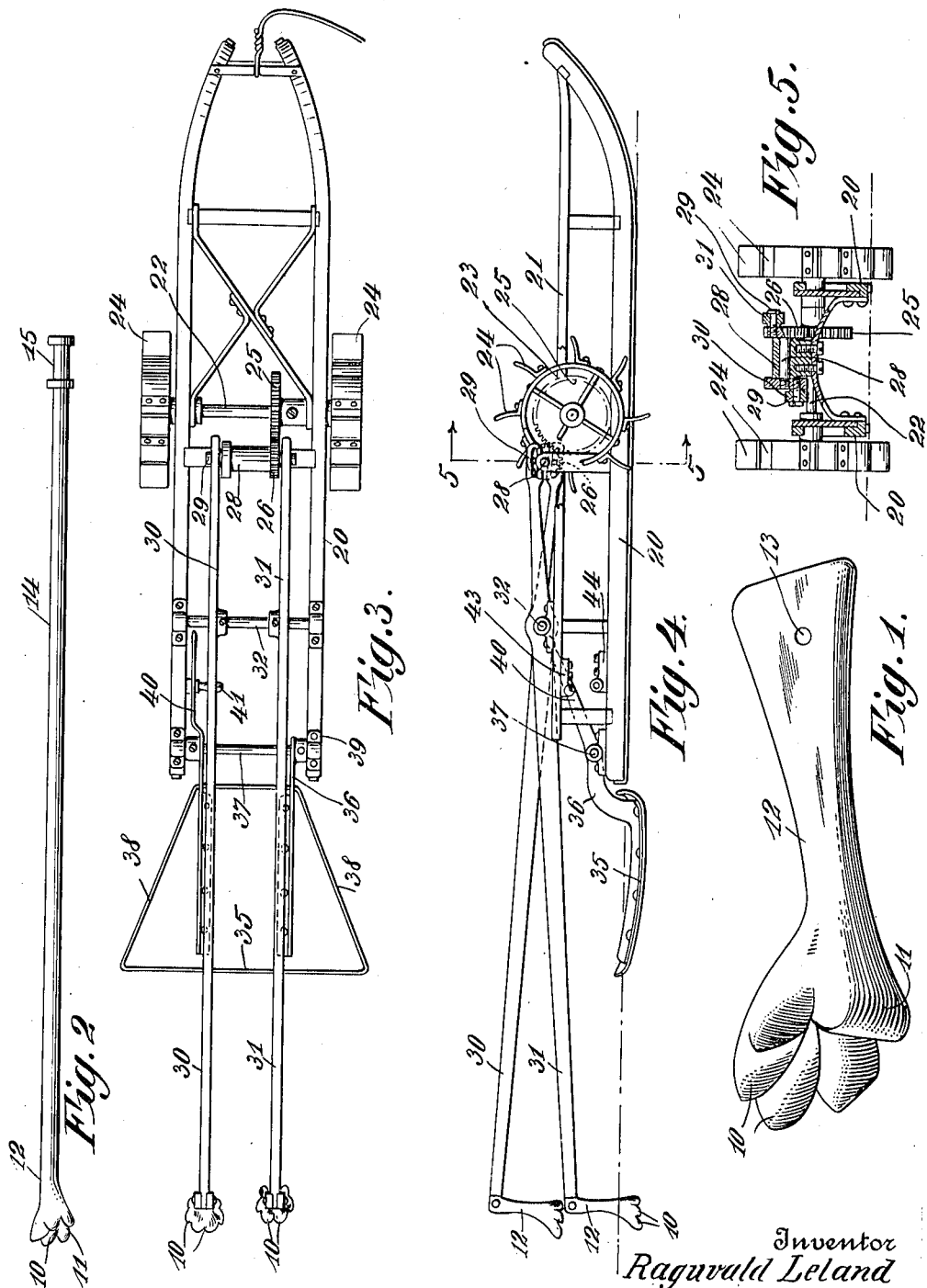

RAGUVALD LELAND, OF BIRCH HILLS, SASKATCHEWAN, CANADA.

STAMP FOR SIMULATING ANIMAL-TRACKS.

1,314,276.  Specification of Letters Patent.  Patented Aug. 26, 1919.

Application filed August 15, 1917. Serial No. 186,346.

*To all whom it may concern:*

Be it known that I, RAGUVALD LELAND, a subject of the King of Norway, and a resident of Birch Hills, in the Province of Saskatchewan and Dominion of Canada, have invented certain new and useful Improvements in Stamps for Simulating Animal-Tracks, of which the following is a specification.

This invention relates to improvements in trapping devices, and has as its special object the provision of means whereby animals may be induced to travel in predetermined paths leading to traps or snares, by means of which they may be secured.

It is a well-known fact that fur-bearing animals, such as foxes, wolves and the like, invariably follow in the foot-steps originally made by one of their kind in the snow and will not deviate therefrom so long as their suspicions are not aroused that the tracks or pathway have been interfered with by a human being, in which latter case the animals will go in a round about way, making a detour to avoid the trap.

The present invention has as its object means whereby the hunter or trapper is enabled to fill and cover up his own foot-steps after setting the trap in position to operate directly in the trackway previously made by a passing animal, provisions also being made whereby the trapper may make a track or foot-prints simulative of that made by the animal so that the animal will not observe that the trap is set, thereby rendering trapping much more profitable than without such devices.

These and other like objects are attained by the novel design, construction and combination of parts hereafter described and shown in the accompanying drawing, forming a material part of this disclosure, and in which:—

Figure 1 is a perspective view showing the simplest form of the invention, consisting of a manually operable stamp by means of which imprints simulative of an animal's foot may be made in the snow.

Fig. 2 is a side elevational view of a similar form of the stamp having a lengthened handle by means of which it may be more conveniently operated.

Fig. 3 is a top plan view of the mechanism whereby foot-prints may be easily and rapidly simulated by mechanical methods.

Fig. 4 is a side elevational view of the same, and

Fig. 5 is a transverse sectional view taken on line 5—5 of Fig. 4.

In the simplest form of the invention, as shown in Fig. 1, a hand stamp is provided, the same having the exact shape of an animal's foot including the toes 10, heel 11, and shank 12, the latter being of such size and length as to be readily grasped by the hand of the trapper, and provided with an opening 13, by means of which it may be readily attached by a cord to the garments or hung up when not in use.

In Fig. 2, the same parts are used, the difference being in the length of the extended stem or handle 14, adapted to be grasped at its upper end 15, and operated somewhat in the manner of a cane or walking stick, thereby rendering its application very convenient and easy.

As such fur bearing animals are provided with an acute sense of smell, the material of which the stamps are made should be of a neutral character, entirely without odor and must be handled with care by the operator so as to avoid contamination, and it is within the province of this invention that the lower end of the stamp may be steeped in animal fat, so as to give an odor characteristic of the animal whose tracks are imitated.

In the arrangement shown in Figs. 3, 4 and 5, a hand drawn sled is provided with runners 20 and mounted substantially midway therein, transversely of the sled, near the top 21, is a shaft 22, having secured at its ends wheels 23, provided with extending spurs 24, extending below the bottom of the runners 20 and engaging with the snow over which the sled is drawn.

Also secured on the shaft 22 is a gear 25, meshing with a pinion 26, fastened upon a shaft 27, mounted parallel to the shaft 22 in the bracket 28, having cranks 29 at its ends, the same being operatively engaged with the ends of levers 30 and 31, the levers being pivoted upon a cross shaft 32, and extending rearward of the sled to the point of attachment with the shanks 12 of the stamps in such manner that as the sled is drawn forward, the stamps are alternately given a step by step movement, producing foot prints precisely similar to that made by an animal passing over the surface of the snow.

In order to obliterate and cover up the tracks of the party drawing the sled, a scraper 35 is attached to a lever stem 36, pivoted on the shaft 37, mounted in bearings 39 at the extreme rear ends of the runners 20, the scraper sides 38 extending outwardly beyond the track of the wheels 23, so that their marks as well as that of the operator's track is entirely obscured and covered by the snow as the sled is drawn along.

This scraper may be raised by means of the hand lever 40, having a projection operated by the knob 41, the projection being engaged with either of the brackets 43 or 44 so as to hold the scraper relative to the height of the runners 20, so as to smooth the surface of the snow or be raised out of contact with it.

In operation, when the tracks of an animal are found by the trapper, the trap is set therein and covered with snow in such manner as to present an undisturbed appearance, after which the trapper retires, filling his own foot-steps with snow and using the stamp to simulate the foot-steps of the animal, presenting an apparently undisturbed condition.

In the use of the apparatus indicated, it is only necessary, after setting the trap, to walk away and draw the sled, permitting the mechanism to form the imprints of the animal in an obvious manner.

Having thus described my invention, what I claim as new, and desire to secure by Letters Patent, is:—

1. A device of the character described, comprising in combination with a hand drawn sled, a pair of levers pivoted at the rear of the sled, means for transmitting the forward motion of the sled to said levers, a pair of stamps simulative of an animal's foot attached to the outer end of said levers beyond the rear end of said sled, means for obliterating the tracks of the sled and its operator, and means for actuating said obliterating means.

2. In a device of the class described, the combination with a hand drawn sled, a shaft transversely mounted therein, spur wheels mounted on one end of said shaft adapted to rotate the same as said sled is advanced, a second shaft driven by the first named shaft, oppositely disposed cams arranged on said second shaft, a pair of levers pivoted at the rear of said vehicle, said levers beyond the rear of said vehicle, a scraper element attached at the rear of said vehicle in front of said stamps whereby the marks of the vehicle and operator are obliterated, and means for raising and lowering said scraper element, all substantially as described.

Signed at Birch Hills, Province of Saskatchewan, Dominion of Canada, this 24th day of July, 1917.

RAGUVALD LELAND.

Witness:
HENRY PLADSEN.